(No Model.)  3 Sheets—Sheet 1.

J. W. HYATT.
FILTER.

No. 273,539.  Patented Mar. 6, 1883.

Attest:
S. Walter Fowler
Chas. O. Gill

Inventor:
John W. Hyatt
By his Attorney
Rowland Cox.

(No Model.) 3 Sheets—Sheet 3.

J. W. HYATT.
FILTER.

No. 273,539. Patented Mar. 6, 1883.

Witnesses:
T. Walter Fowler
Chas. C. Gill

Inventor:
John W. Hyatt,
By his Atty.
Rowland Cox

UNITED STATES PATENT OFFICE.

JOHN W. HYATT, OF NEWARK, NEW JERSEY.

FILTER.

SPECIFICATION forming part of Letters Patent No. 273,539, dated March 6, 1883.

Application filed November 11, 1882. (No model.)

*To all whom it may concern:*

Be it known that I, JOHN W. HYATT, a citizen of the United States, residing at Newark, in the county of Essex and State of New Jersey, have invented certain new and useful Improvements in Filters; and I do hereby declare the following to be a full, clear, and exact description of the invention, such as will enable others skilled in the art to which it appertains to make and use the same.

The invention relates to an improvement in the art of filtration; and it consists in certain novel filtering apparatus, and will be fully understood from the detailed description hereinafter presented, reference being had to the accompanying drawings.

It is well known that in filters of large area difficulty has heretofore been experienced in cleaning the beds of filtering material, owing to the fact that the water used for that purpose will, under all usual conditions, find one or more passages through the bed, leaving the remainder undisturbed and uncleansed. This is true of filters containing a bed of large area and, for instance, one foot in depth, as well as in filters in which a filter-bed of, say, five or eight or a greater number of feet in depth is employed. By the invention sought to be protected herein means are presented whereby every particle of the bed of filtering material, whether the same be one foot in depth or a greater number, may be thoroughly agitated and cleansed.

In the accompanying drawings I illustrate various forms of filters embodying my invention.

Figure 1:
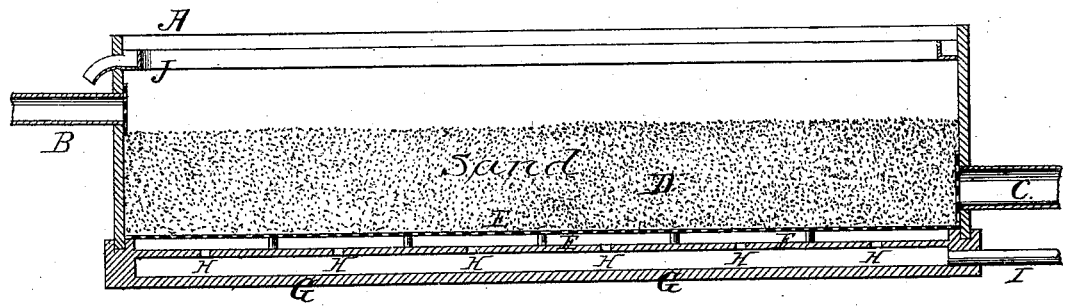
Figure 2:
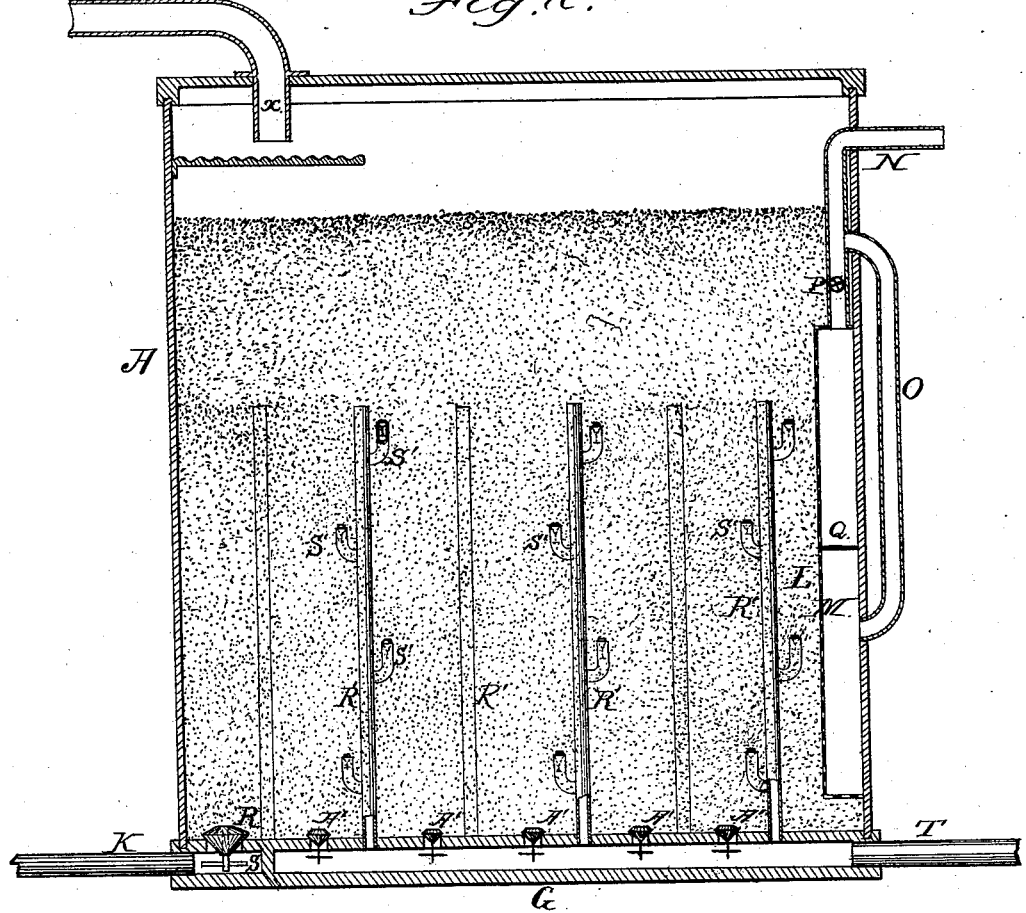
Figure 3:
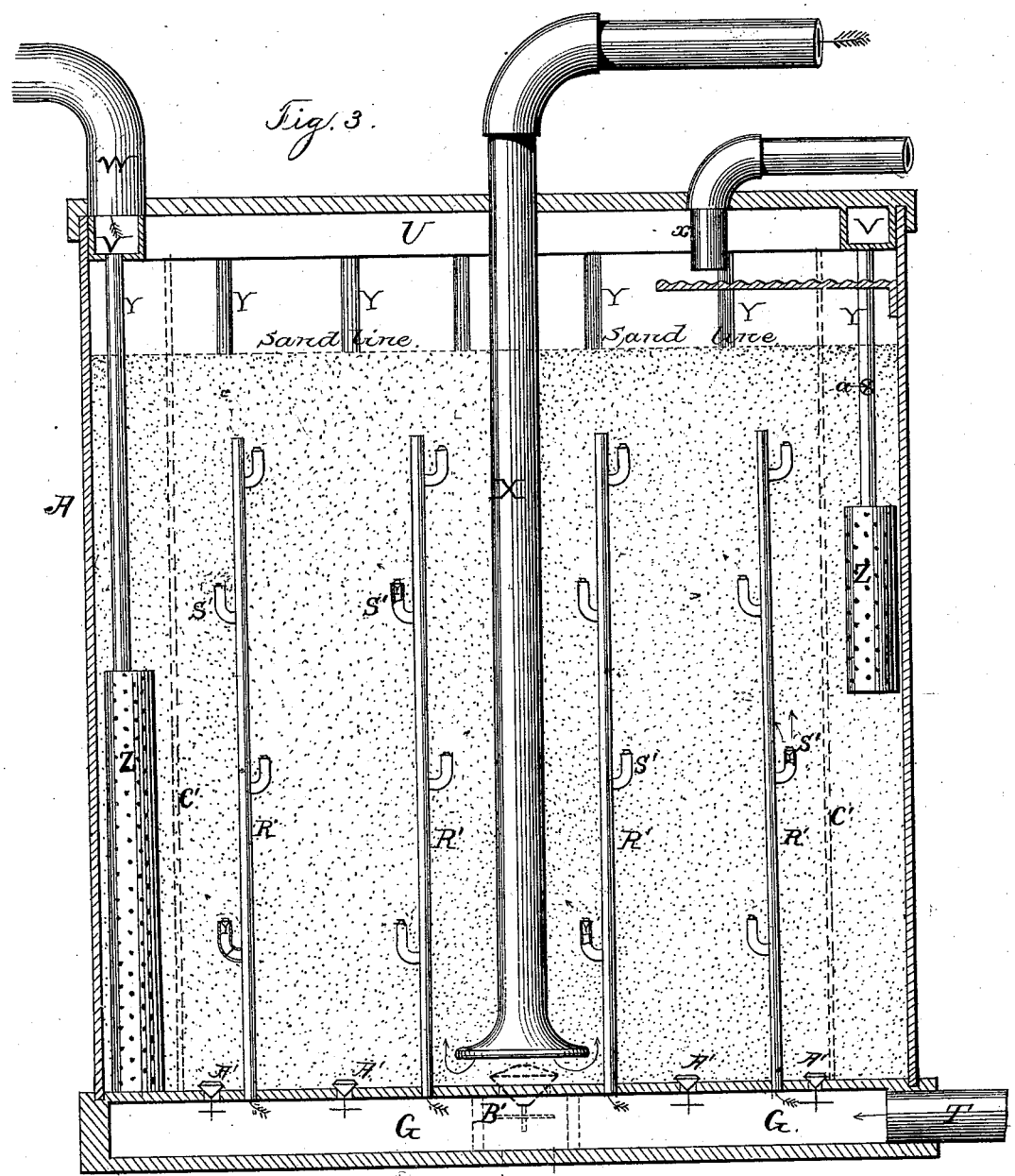
Figure 4:
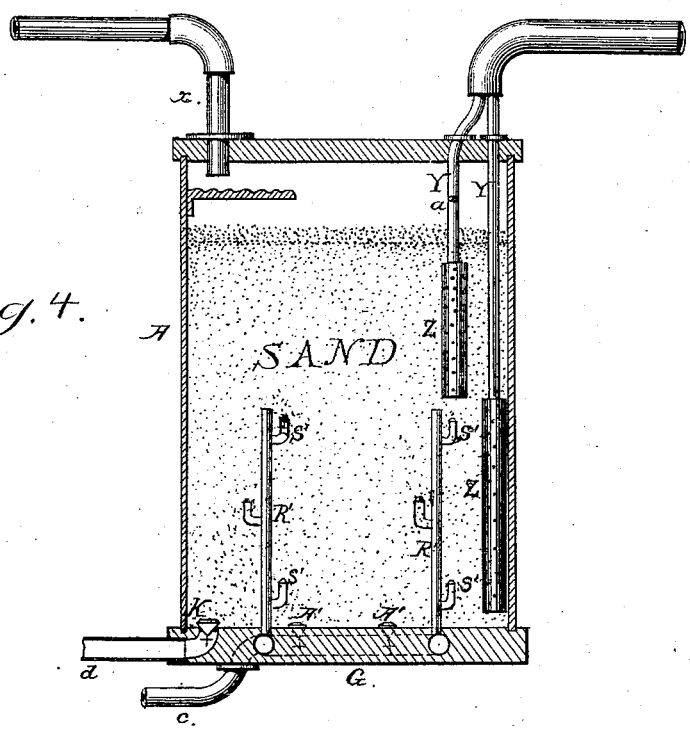
Figure 5:
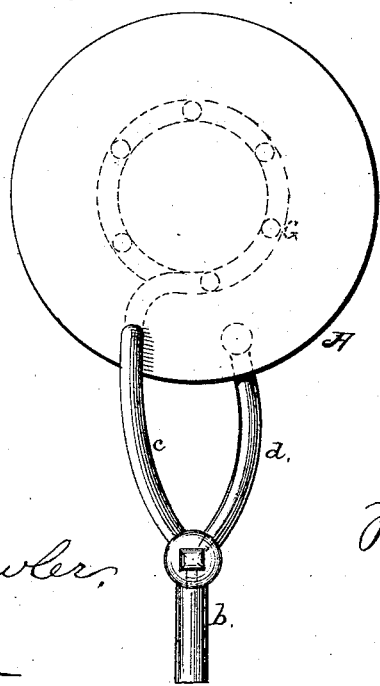

In Figure 1, I show a sectional view of a filter employing a bed of about one foot in depth. Fig. 2 illustrates a sectional view of a filtering apparatus designed to contain a bed of filtering agent of about five feet in depth. Fig. 3 shows an apparatus which will be about eight feet in diameter, and which will be used for filtering large volumes of water. Fig. 4 represents a sectional view of a filter intended for household purposes, and Fig. 5 is a plan view of same.

In the drawings, referring to Fig. 1, A indicates what may be considered, for purposes of description, a rectangular-shaped receptacle, having an inlet, B, and an outlet, C, and containing preferably a bed of filtering material, in granular or comminuted form, of about one foot in depth. The bed of filtering material (lettered D) will rest upon a sheet of perforated metal or wire-cloth, E, or upon any other base which will permit the passage through it of the water without allowing the escape of the sand or other material of which the bed may be composed. The sheet of perforated metal E will rest upon projections above the upper surface, F, of the hollow bottom G. In the upper surface, F, of the hollow bottom G are formed at regular intervals the apertures H, one of the apertures being arranged preferably below about every square foot of the filter-bed. The hollow bottom G will be connected with a suitable supply-pipe, I, which will lead the water to the apparatus during the operation of washing the filter-bed.

In the operation of filtering by means of the apparatus illustrated in Fig. 1 the water enters through the inlet B, passes through the filter-bed, and escapes at the outlet C in a purified condition. After the bed has become foul from the deposition of silt and other impurities arrested from the water or other liquid being filtered, the supply of the unfiltered water is cut off and water is forced through the pipe I into the hollow bottom G, and thence through the apertures H and perforated metal E into the filter-bed D. The effect of causing the water to enter the filter-bed through the apertures H, arranged in the manner described, is to cause a thorough agitation and cleansing of every part of the filtering material. The water which is used in cleansing the filter-bed will rise over the same and pass off through the waste trough or spout J. If the water passing through the pipe I were allowed to flow through the hollow bottom G and apertures H without having its force controlled, it is probable that it would pass through the apertures H close to its outlet and find its way in broken currents through that portion of the filter-bed and escape without effecting the purposes desired. In order to secure the best results from the influx of the water through the pipe I, I construct the apertures H of such size that their area in the cross-section will not equal that of the pipe I, whereby there is caused a resistance to the inflowing ber V extends downward into the filter-bed, around the outer portions thereof, the series of pipes Y, which terminate in the perforated cylinders Z, every alternate pipe Y, with its cylinder Z, terminating at about the horizontal center of the filter-bed, while the other cylinder, Z, extends into the lower portions thereof.

I do not propose to employ the pipe X and the perforated cylinder Z in all instances, as other and simpler means may be substituted therefor with good results in some cases. For example, in lieu of the pipe X, I am able to have the entrance for unfiltered water in the bottom G, as indicated in dotted lines, and lettered B', and to dispense with the perforated cylinders Z and pipes Y by having an inner lining of perforated material (shown in dotted lines and lettered C') which will connect with an outlet. It will not be necessary, of course, to employ both the pipe X, with cylinders Z, and the inlet B', with perforated inner lining, C'; but either may be used with satisfactory results. The operation of filtering water by means of the apparatus shown in Fig. 3 is as follows: The water enters through the central pipe, X, or through the inlet B', according to which is used, and finds its outlet in the lower central portions of the filter-bed. Its tendency will be to rise upward through the central part of the bed. During the operation this central part of the filter-bed will become thoroughly agitated, and will attain a semi-liquid consistency, while the remaining part encircling this central agitated portion will remain in a practically quiescent state, and the water passing through it will be thoroughly cleansed and find its outlet through the perforated cylinders Z and the pipes Y, or through the perforated lining C', according to which is employed, and thence through the delivery-pipe W. In order to clean the filter-bed, the pipes X and W are closed, and the water is permitted to enter the valves A' or the vertical pipes R', according to which is used, and which are employed in this filter in the manner and for the same purpose as in the filter shown in Fig. 2, and hereinbefore described. The water leaving the valves A' and pipes R' passes through the bed of filtering material, rising upward through the same and finding an outlet through the waste-pipe x. In order to prevent, during the operation of the filter, the return of the water from the annular chamber V into the shorter pipes Y, (when the lining C' is not employed,) check-valves a will be provided in the said shorter pipes, which will prevent the return of the water into the bed, but will permit its escape therefrom. The liability of the water to return to these shorter pipes is owing to the lighter resistance in the upper portions of the filter-bed.

In Figs. 4 and 5, which illustrate a filter for household purposes, the same principles of construction and operation hereinbefore described as relating to the larger filters are retained. In this filter, A indicates the body of the apparatus, having a hollow base, G, and supply K, together with valves A', or the pipes R', similar to those described hereinbefore. The delivery of the filtered water is by means of the perforated cylinders Z and their connecting-pipes Y, which in this filter will be arranged at one side thereof and opposite to the inlet. At the upper part of the filter there is a waste-pipe, x, through which the water employed for cleansing the filter-bed escapes. The inlet to the filter for the unfiltered water and for the water used in cleaning the filter-bed may come from one common supply-pipe, b, provided with two branches, c d, one leading to the supply for the unfiltered water and the other to the hollow base G, a three-way cock being provided at the point of juncture of the branch pipes c d with the main pipe b, whereby the current of water may be directed either into the branch c or d, according as it is desired to filter the water or wash the filter-bed. The water to be filtered enters through the inlet K and escapes through the cylinders Z and pipes Y. In cleansing the filter-bed the inlet K and the delivery-pipe connecting with the pipes Y and cylinder Z are closed and the water caused to flow through the branch c into the hollow bottom G, thence through the valves A' or the pipes R', according to which is used, whence it will rise through the filter-bed and escape through the waste-pipe x.

In each of the filters hereinbefore described a rippling-plate or similar contrivance may be placed just below the waste-pipe x, in order to prevent a strong current through the said pipe x, whereby some of the elements of the filter bed might escape. In all cases the rippling plate will not be required, but may be used as a precaution against the escape of the filtering material under any undue pressure of water through the apparatus.

What I claim as my invention, and desire to secure by Letters Patent, is—

1. The filter herein described, consisting of a receptacle having an inlet and an outlet, and containing a bed of filtering material, and supplied within the receptacle with a series of inlets at its lower portion for the entrance of the water to be used in washing the bed, combined with a series of automatically-operating check-valves which control said series of inlets, said inlets being arranged as set forth, and having a combined area in cross-section less than that of the pipe supplying them, substantially as explained.

2. The filter herein described, consisting of a receptacle containing a bed of filtering agent, an inlet at the bottom of said bed for unfiltered water, and an outlet for the purified water adjacent to the edges of the receptacle, the construction being such that during the operation of the filter the vertical portion of the filter-bed above the inlet will be agitated or put in a state of ebullition, and the surrounding portions will remain in a quiescent condition, substantially as set forth.

3. The filter herein described, consisting of a receptacle containing a bed of filtering material, and having a hollow bottom, G, and a series of inlets, each provided with a check-valve, A', which valves permit the entrance of the water used in washing the filter-bed and prevent the escape of the elements thereof, substantially as set forth.

4. In a filter, the hollow bottom having an inlet, and the vertical pipes having subordinate branches, substantially as set forth.

5. A filter consisting of a receptacle having an inlet for the unfiltered water by the central pipe, X, outlets for the clean water by the pipes Y, and perforated cylinders Z, the outlet-pipes being adjacent to the outer portions of the filter-bed, substantially as set forth.

In testimony whereof I affix my signature in presence of two witnesses.

JOHN W. HYATT.

Witnesses:
CHAS. C. GILL,
HERMAN GUSTOW.